E. E. McKINNEY, Jr.
CHUCK FOR ROCK DRILLS.
APPLICATION FILED MAY 28, 1907.
922,716.
Patented May 25, 1909.
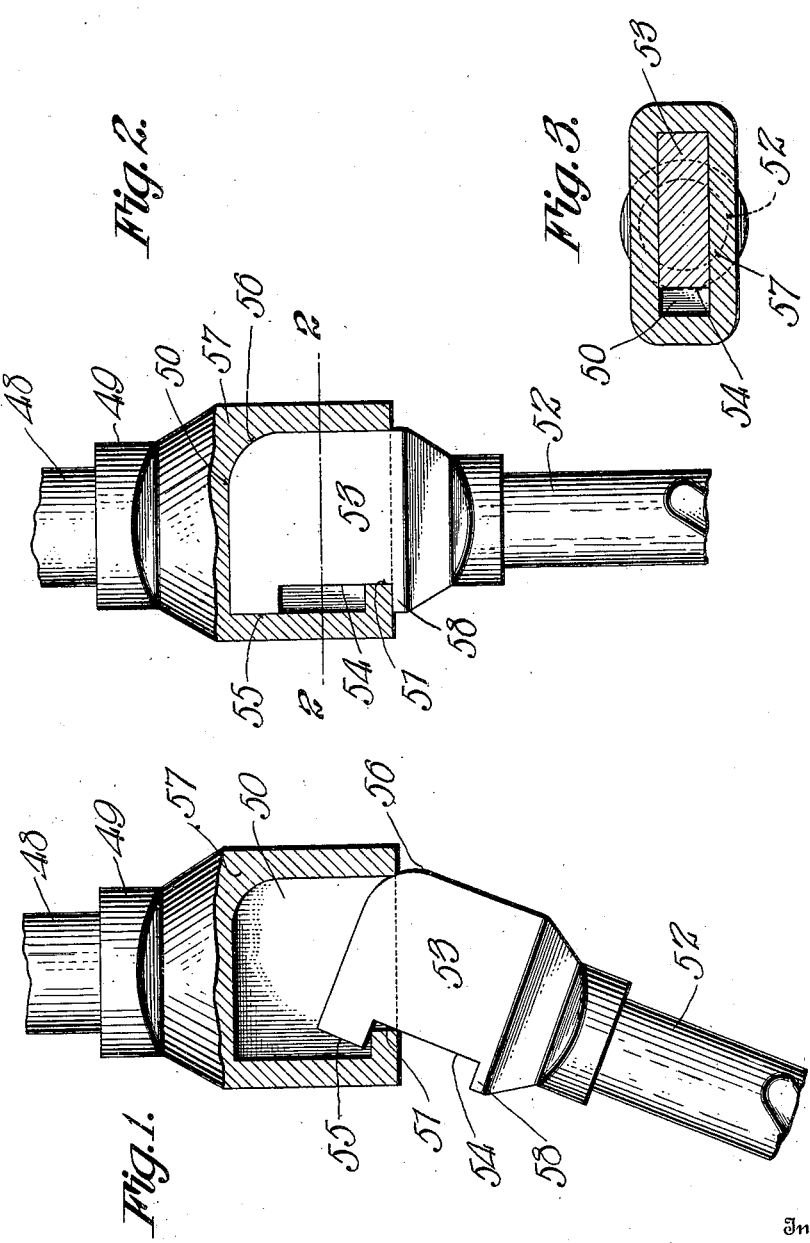
Inventor
Eli E. McKinney Jr.,

UNITED STATES PATENT OFFICE.

ELI E. McKINNEY, JR., OF FARMINGTON, ILLINOIS.

CHUCK FOR ROCK-DRILLS.

No. 922,716.　　　　　Specification of Letters Patent.　　　　Patented May 25, 1909.

Application filed May 28, 1907. Serial No. 376,171.

*To all whom it may concern:*

Be it known that I, ELI E. McKINNEY, Jr., a citizen of the United States, residing at Farmington, in the county of Fulton, State of Illinois, have invented certain new and useful Improvements in Chucks for Rock-Drills; and I do hereby declare the following to be a full, clear, and exact description of the invention, such as will enable others skilled in the art to which it appertains to make and use the same.

The invention relates to chucks and more particularly adapted for use with the class of coal or rock mining drills.

The primary object of the invention is the provision of a chuck so constructed and arranged that the drill may be readily inserted in the socket and having its bearing against a solid portion at the interior of the drill socket and also to enable the said drill to be properly centered therein.

Another object of the invention is the provision of a chuck for receiving a drill whereby the latter will be prevented from accidental displacement and can be readily and easily withdrawn while in an inoperative position.

With these and other objects in view, the invention consists of the novel features of construction and combination of parts illustrated in the accompanying drawings and as will be more fully hereinafter described while the novelty of the invention will be included in the claims appended.

In the drawings:—Figure 1 is a longitudinal sectional view of the drill socket showing the drill about to be withdrawn therefrom. Fig. 2 is a similar view of the drill socket with the drill inserted within the said socket. Fig. 3 is a sectional view on the line 2—2 of Fig. 2.

Similar reference characters indicate corresponding parts throughout the several views in the drawings.

In the drawings, the numeral 48 designates the end portion of a drill shaft having mounted thereon a drill socket member 49 having a longitudinal recess 50, one of the end walls of said recess being formed with an inwardly projecting lug 51 at its outer edge and at right angles thereto. The drill or auger 52 is formed with a rearwardly extending shank 53 having an elongated recess 54 cut in one of its side edges to form a projecting tang 55 at one end of said recess and an abutment shoulder 58 at the opposite end of the latter. The other side edge of the shank 53 is curved at its rear end as at 56 to facilitate its introduction into the recess 50 and also to aid in the centering of the drill or auger, and said recess has a similarly curved wall 57 which coöperates with the curved edge 56 whereby a positive fitting of the extension in the recess is effected and to maintain the said auger or drill properly centered when in use.

It is obvious that when the drill or auger is in use by the extension being inserted in the socket the rearmost wall of said extension will have its bearing against the bottom of the socket so as to form a solid bearing for the extreme end of said drill or auger while the same will have a bearing against the projecting lug 51 by having the shoulder 58 contacting therewith.

In Fig. 1 the drill or auger shank 53 is shown partly engaged in the recess 50 such engagement being effected by inserting said auger shank at an angle in said recess and then by turning the same into alinement therewith the drill or auger will be coupled and properly centered in the drill socket, as shown in Fig. 2. The lug 51 engages the tang 55 as a stop to prevent accidental displacement of the parts. The auger shank 53 is displaced by reverse operation to that described.

From the foregoing description it will be seen that simple and efficient means are provided for accomplishing the objects of the invention, but, while the elements herein shown and described are well adapted to serve the functions set forth, it is obvious that various minor changes may be made in the proportions, shape and arrangement of the several parts without departing from the spirit and scope of the invention as defined in the appended claim.

What is claimed is—

In a device of the class described, a casting having an elongated socket therein, an inwardly projecting lug at the mouth of said socket and at right angles to its end walls and in the plane with the outer edges thereof, the base of said socket being provided with a curvature at the corner of the same joining the end wall thereof opposite the lug, and a drill having a terminal head correspondingly shaped with respect to the socket and adapted to snugly fit within the same, the said head having an elongated recess in one edge thereof to form spaced shoulders adapted to alternately contact with said lug when engaging the recess in the head.

In testimony whereof, I affix my signature, in presence of two witnesses.

ELI E. McKINNEY, Jr.

Witnesses:
SAM SAMUELSON.
JOHN HOLMS.